United States Patent Office 3,009,827
Patented Nov. 21, 1961

3,009,827
METHOD OF PREPARING SILICA PIGMENT
Hans Deuel, Zurich, and Jörg Wartmann, Horgen, Switzerland, assignors, by mesne assignments, to Pittsburgh Plate Glass Company
No Drawing. Filed Oct. 1, 1957, Ser. No. 687,343
14 Claims. (Cl. 117—100)

This invention relates to a novel method of preparing a siliceous pigment and to the novel pigmentary reaction products thereby produced. Prior to the present invention, it has been known that a silica pigment suitable for reinforcing rubber and for other purposes can be prepared by reaction of an acid or acidic reacting material with a metal silicate, such as an alkali metal silicate or alkaline earth metal silicate under properly controlled conditions. The preparation of such pigments is described in considerable detail and claimed in an application of Edward M. Allen, Serial No. 283,721, filed April 22, 1952, now U.S. Patent 2,805,955.

Pigments produced according to the processes described in the above identified application are finely divided, essentially amorphous, porous, hydrated silica flocs which contain in excess of about 80 percent, and usually about 90 percent by weight of $SiO_2$, measured on the anhydrous basis (that is, on a basis excluding free and bound water). The pigment also contains bound water in the proportion of 1 mole per 3 to 9 moles of $SiO_2$. Up to about 10 percent by weight of free water may be present although the free water can be eliminated substantially completely by heating at a temperature of 105° C. for a period of 24 hours.

The term "free water" as used herein is intended to denote the water which can be removed from the silica pigment by heating the pigment at a temperature of 105° C. for a period of 24 hours in a laboratory oven. The term "bound water" as used herein is intended to mean the amount of water which is driven off from the silica pigment by heating the pigment at ignition temperature, for example, 1000 to 1200° C., until no further water can be removed, minus the amount of free water in the pigment. This bound water apparently is chemically bound in the pigment. For this reason, the bound water does not come off readily unless the silica is dried at temperatures above about 375 to 400° C.

The above described pigment has an average ultimate particle size below 0.1 micron, usually in the range of 0.01 to 0.05 micron. It may also contain small amounts of metallic components. It may contain some alkali, usually less than about 1.75 percent, preferably less than one percent by weight of $Na_2O$ (present as an alkaline type radical which is titratable by acid). The pigment may also contain up to about 10 percent by weight of an alkaline earth metal or zinc or aluminum (computed as the oxide thereof). These metals also appear in the pigment apparently in chemical association with the silica.

The surface area of the pigment herein contemplated normally ranges from about 10 to 800 square meters per gram and, in the case of rubber reinforcing pigments, the surface area normally exceeds 75 and is below 250 square meters per gram.

According to the present invention valuable organic derivatives of the above pigment may be prepared by introducing acid halide radicals therein and thereafter reacting the resulting pulverulent silica pigment which contains acidic halogen with an organic compound such as an alcohol or other compound including those mentioned hereinafter which reacts with an acid halide to form esters or compounds containing the group C—X— where X is the metal or atom linked to the acid halide radical such as sulphur, titanium, etc. and C is carbon.

The acid halide radical may be introduced into the silica by reacting the silica pigment in pulverulent state with an inorganic acid halide, particularly a halide, of an element of groups III to VI, inclusive, periods 2, 3, 4, 5, and 6 (as the elements are classified in the periodic table of elements, see Handbook of Chemistry and Physics, 37th edition, pages 388 to 389). Preferably, this treatment should be conducted substantially in the absence of liquid water to avoid undue side reaction of the halide with free water. Most advantageously, the free water is substantially completely removed (reduced below about 2 percent by weight prior to treatment with the metal halide). In this way reaction with bound water is promoted and a product which contains acid halide groups is produced.

Typical metal halides which are used for this purpose include silicon tetrachloride, titanium tetrachloride, zirconium tetrachloride, tin tetrachloride, antimony tetrachloride, vanadium trichloride, vanadium pentachloride, aluminum chloride, boron trichloride, phosphorous pentachloride, phosphoryl chloride, arsenic trichloride, arsenic pentachloride, and the corresponding bromides, fluorides, and iodides of these metals, as well as the corresponding halides of germanium, niobium, and the like.

The introduction of the acid halide into the silica may be effected in various ways. According to one suitable method the halide may be vaporized and passed through a bed of the silica pigment. Many of these halides, such as titanium tetrachloride, silicon tetrachloride, tin tetrachloride, and the like are vaporized at a relatively low temperature (below 200° C.). Consequently, such materials may be readily vaporized and the vapors thereof led through a bed of the silica pigment. Alternatively, the contact may be conducted by dispersing the silica pigment and the metal halide in a chlorinated hydrocarbon, for example, carbon tetrachloride, chloroform, methylene chloride, ethylene chloride or the like, or other solvent, preferably one which is immiscible with water. In such a process, the solvent-silica-metal halide mixture is usually heated at 40 to 200° C., usually reflux temperature of the liquid phase, whereby evolved hydrogen halide, for example HCl, is driven off. The heating is continued until the bound water content of the silica has been reduced and/or until the product contains acid halid groups in combination therewith.

The reaction product is as follows:

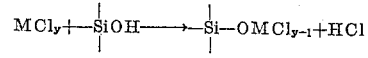

In the case of the tetravalent halide of titanium, silicon or tin, some of the reactions may be as follows:

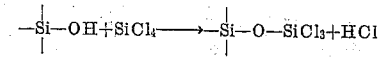

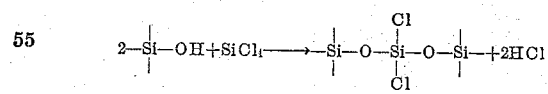

In the above equations, titanium, tin or like elements may replace silicon.

If free water is present in the pigment, the free water, of course, reacts with the metal chloride or other halide.

Since the metal halide reacts more readily with the free water, it is apparent that the amount of metal halide, such as silicon tetrachloride or the like, which is used must be in excess of that which is required to react with the free water content of the pigment. Thus, in order to achieve reaction of the metal halide with the bound water content of the pigment, the free water must be largely consumed and, where large amounts of free water are present, correspondingly large amounts of metal halide will be required. Conversely, it follows that the less free water present, the less metal halide is required.

In order to conserve the amount of metal halide required and to prevent or minimize side reaction with water, it is desirable to reduce the free water content to a comparatively low figure prior to treatment. Normally, the free water content should not exceed about 20 percent by weight. Preferably, the free water is driven off from the pigment by heating at 100° C. or above, or by other suitable method, in order to reduce the free water content below about 2 percent by weight.

The amount of metal chloride which is used depends upon the results desired. Since bound water appears to be present in the silica as hydroxyl groups, the silica pigment is potentially capable of reacting with a maximum of two equivalents of metal chloride per mole of bound water.

Other metal halides react in the same way. In such a case, the result is to produce a silica pigment which contains acidic halide groups.

As a practical matter, only about one third of the bound water reacts and the product normally contains some residual halide in the form of an acid halide radical capable of reacting with alcohols or basic agents.

Thus, the amount of metal halide which is used may range from 2 to 200 percent by weight, based upon the weight of the hydrated silica treated. Larger amounts may be used but generally are not consumed.

In order to reduce the amount of metal chloride which is required in order to consume all or the major portion of the bound water, a portion of the bound water may be driven off by calcination or heating at temperatures above about 350° C. Thus, heating at any temperature in the area of 500 to 800° C., the concentration of bound water may be reduced to the point where the molecular ratio of $SiO_2$ to bound water in the molecule is substantially in excess of 9, and may range to as high as about 85.

The temperature of the reaction normally is maintained at room temperature or above. Temperatures as high as several hundred degrees centigrade can be used.

The materials which are produced by this process are solid, pigmentary powders of lower bound water content than the pigment from which prepared but otherwise having the same general physical and chemical properties. In addition to the $SiO_2$ radical, they contain the metal radical (silica or sulphur being included as a metal) of the acid halide used in the treatment. In general, they also contain, as stated above, an acid halide radical. As a consequence, the pigments normally are acidic in character and highly reactive.

Following production of the silica pigment which contains acid halide groups, this product is reacted with organic compounds which contain labile hydrogen, particularly those which contain radicals which react with acids or acid chloride. Thus the products may be reacted with alcohols including both monohydric and polyhydric alcohols such as ethyl, methyl, allyl, cinnamyl, 2 chloroethyl, lauryl, cetyl, 2 chloroallyl, stearyl, 2 nitroethyl, oleyl, propargyl, benzyl or phenylethyl alcohol or ethylene glycol, glycerol, sorbitol, propylene glycol, polyethylene oxide, polypropylene oxide, styrene glycol, diethylene glycol, tetraethylene glycol, diethyl tartrate, ethyl lactate, monoethanol amine, triethanol amine or like compound which contains a free hydroxyl group which reacts as an alcohol.

By following this procedure, the silica pigment is converted from a hydrophilic organophobic state to an organophilic and frequently hydrophobic state. A more extensive introduction of organic radicals on the silica particle is achieved than when the alcohol is reacted directly with silica which contains no acid halide groups.

The following examples are illustrative:

EXAMPLE I

A quantity of finely divided silica containing about one mole of bound water per 6 moles of $SiO_2$ and having an average ultimate particle size in the range of 0.022 micron, and containing about 85 percent $SiO_2$ by weight and having a surface area of about 160 square meters per gram, was reacted with acid in order to extract metallic impurities. The resulting silica which contained about 220 milliequivalents of bound OH groups (bound water) per 100 grams of pigment, was dried for 24 hours at 105° C. and 11 millimeters pressure and then 5 grams of this dried silica was refluxed for 12 hours with 40 milliliters of thionyl chloride and 80 milliliters of benzene. The apparatus in which the refluxing was conducted was protected against atmospheric moisture. Thereafter, the benzene and excess of the thionyl chloride was distilled off at 70–80° C., 11 millimeters Hg absolute pressure. The resulting product contained about 55 milliequivalent of acidic chloride, per 100 grams of pigment, the apparent reaction being substantially as follows:

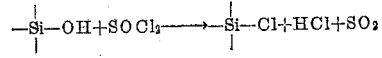

Five grams of the chlorinated product thus obtained was mixed with 40 milliliters of dry pyridine and 80 milliliters of one of the alcohols listed below and the mixture stirred for 4 hours at 80° C. All alcohols used were dried with calcium hydride and distilled before using.

The resulting products were centrifuged, washed 5 times with absolute methanol and centrifuged after each washing. Thereafter the products were extracted with absolute ether and dried at 50° C. and an absolute pressure of 0.01 millimeter Hg for 12 hours.

The results are tabulated in the following table:

| Alcohol used | Percent carbon in product by weight | Percent hydrogen in product by weight | Milliequivalents of OH groups per 100 grams of product |
|---|---|---|---|
| Methanol | 1.24 | 0.53 | 75 |
| Do | 1.61 | 0.68 | 105 |
| Ethanol | 1.27 | 0.51 | 39 |
| Do | 1.29 | 0.56 | 40 |
| Propanol | 1.83 | 0.70 | 42 |
| Butanol | 2.35 | 0.73 | 42 |
| Amylalcohol | 2.38 | 0.72 | 33 |
| Hexanol | 3.79 | 1.07 | 46 |
| Octanol | 3.22 | 1.17 | 20 |
| Benzylalcohol | 3.04 | 0.76 | 32 |
| Do | 3.34 | 0.67 | 36 |
| β-phenylethyl alcohol | 4.93 | 0.93 | 48 |
| Isopropanol | 0.94 | 0.50 | 16 |
| Isobutanol | 1.32 | 0.56 | 20 |
| t-Butanol | 0.61 | 0.47 | 5–6 |

They were all wettable with ether. The products derived from butanol, amylalcohol, hexanol, octanol, benzyl alcohol and β-phenylethyl alcohol (alcohols containing 4 or more carbon atoms) were not wettable with water.

EXAMPLE II

A quantity of finely divided silica containing about one mole of bound water per 6 moles of $SiO_2$ and having an average ultimate particle size in the range of 0.022 micron, and containing about 85 percent $SiO_2$ by weight and having a surface area of about 160 square meters per gram was dried for 24 hours at 80° C. at an absolute pressure of 0.001 millimeter of Hg and then 5 grams of this silica was refluxed for 12 hours with 60 milliliters of silicon tetrachloride. The apparatus in which the refluxing was conducted was protected against atmospheric moisture. Thereafter, the excess of the silicon tetrachloride was distilled off in vacuo.

Eighty milliliters of alcohol and 40 milliliters of absolute pyridine were added to the dry residue and the mixture heated at 50–80° C. for 4 hours and recovered as in Example I. Methanol, ethanol, propanol and butanol were used as the alcohol in separate experiments.

The product obtained with methanol was hydrophobic but hydrolyzes easily. The butanol derivative was much more stable even after contact with water for one week. All of the products were hydrophobic and much more stable against water than the corresponding products produced using thionyl chloride as in Example I.

The products produced as described above are finely divided pigments having the general particle size of the silica subjected to treatment.

In the above examples, pyridine was used as a hydrogen halide acceptor. Various other strong bases such as alkali metal or alkaline earth metal hydroxides, carbonates or bicarbonates may be used in lieu of pyridine. Moreover, the hydrogen halide acceptor may be eliminated. However, the degree of reaction may be reduced in this case.

Frequently it is desirable to remove the acid halide radicals at least partially from the treated silica pigment. This may be accomplished by heating the treated silica in a stream of air at a temperture above 100° C., usually not over 900° C.

EXAMPLE III

The process of Example I is repeated using silica containing about 0.75 percent by weight of bound water and prepared by calcining silica pigment at about 700° C., substantially as described in a copending application of Alphonse Pechukas, Serial No. 290,536, filed May 28, 1952, now U.S. Patent 2,805,956. After reflux the silicon tetrachloride is distilled off and the product heated in a stream of air at 200° C. for 3 hours. A product having properties similar to that of the acid chloride containing silica produced according to Example I was thus obtained. Organophilic products are produced therefrom using the alcohols mentioned in Example I.

It will be understood that silica pigments reacted with other metal halides or acid halides may be treated with alcohol as herein contemplated. The following is a typical example of such other silica derivatives which may be used in lieu of the silica derivatives used in the above examples:

EXAMPLE IV

A quantity of finely divided silica dried as in Example I and containing about one mole of bound water per 6 moles of $SiO_2$ and having an average ultimate particle size in the range of 0.022 micron, and about 85 percent $SiO_2$ by weight and having a surface area of about 160 square meters per gram and the bound water content equal to about one mole per 6 moles of $SiO_2$ is dried for 24 hours at 105° C. and then 5 grams of this silica is refluxed for 12 hours with 100 milliliters of titanium tetrachloride as in Example I. Thereafter, the excess of the titanium tetrachloride is distilled off in vacuo. The resulting product contains a large amount of acidic chloride.

This product is treated with alcohols as in Example I, organophilic pigments being obtained.

In the practice of any of the above examples tin tetrachloride or tetrafluoride or other metal halides mentioned above may be substituted partially or completely for the thionyl chloride or silicon tetrachloride.

It is also possible to react other inorganic acid halides which react with hydroxyl groups liberating hydrogen halide. Thus, the hydrated silica may be reacted with boron trichloride, boron trifluoride, phosphorous pentachloride, sulfuryl chloride, phosgene or the like to produce a product of lower bound water content.

According to a further embodiment, the silica after treatment with an inorganic acid halide such as thionyl chloride, titanium tetrachloride or the like may be reacted with an organic compound which contains a metal atom such as zinc, cadmium, or an alkali metal, or alkaline earth metal or the like linked to an organic radical directly through carbon. Typical of such compounds are the metal alkyls and metal aryls such as lithium ethyl, lithium propyl, lithium phenyl, lithium heptyl, lithium methyl, sodium phenyl, $C_6H_5CH_2K$, $(C_6H_5)_3CNa$, magnesium Grignard reagents having the formula R Mg hal where R is an organic radical and hal represents halogen such as bromide or iodide such as $C_2H_5MgI$, $C_6H_5MgBr$, $C_2H_5MgBr$, magnesium diethyl, magnesium dibutyl, etc. Normally the radical linked to the carbon atom does not contain more than 10 carbon atoms. The following example is illustrative:

EXAMPLE V 18.5 grams of butyl chloride was reacted with 3 grams of lithium chips in 150 milliliters of absolute ether. The resulting reaction mixture was added dropwise to 5 grams of silica prepared and treated with thionyl chloride as in Example I.

The reaction was extremely exothermic. The product was centrifuged and then washed with methanol and then treated three times with a mixture of two volumes of methanol and one volume of water to remove unreacted lithium.

The resulting product was extracted with ether. It was a hydrophobic finely divided white pigment and contained 2.85 percent carbon and 1.13 percent hydrogen by weight.

Other metal alkyls or metal aryls may be reacted in the same way.

Various amines and like basic nitrogen compounds which contain the group

may be reacted with the above described silicas which contain acid halogen. Typical amines which may be used are ethyl amine, ethylene diamine, phenyl amine, phenylene diamine, aniline, hexamethylene diamine, methyl amine, dimethyl amine, monoethanol amine, octadecyl amine, or the like. These basic nitrogen compounds may be used in stoichiometric amount in lieu of alcohols in any of the above examples.

The following example is illustrative:

EXAMPLE VI

Five grams of silica pigment reacted with silicon tetrachloride as in Example II is mixed with 80 milliliters of ethylamine and the mixture is heated at 80° C. for 12 hours. Thereafter the unreacted amine is distilled off. An organophilic product is obtained.

The silica containing acid chloride also may be condensed with aromatic hydrocarbons which contain a labile hydrogen and which condense with aliphatic chloride in the presence of Friedel-Craft catalysts such as aluminum chloride or ferric chloride. Typical aromatic compounds contemplated are benzene, toluene, xylene, monochlorobenzene, trichlorobenzene and the like.

The following is an example:

EXAMPLE VII

A mixture of 5 grams of the dried silica referred to in Example I, 100 milliliters of benzene and 30 grams of thionyl chloride is refluxed for 12 hours and the liquid reactants distilled off at 60° C. and an absolute pressure of 11 millimeters of Hg.

The dry residue is mixed with 150 grams of absolute benzene and this mixture refluxed and stirred. After 30 minutes 5 grams of anhydrous aluminum chloride is added and stirring and refluxing continued for 3 hours. The reaction mixture is washed twice with water, benzene and toluene, respectively, and centrifuged each time. A finely divided white product is obtained which contains 1.6 percent by weight of carbon.

When this product is mixed with water and ether nearly all of the material goes into the ether layer.

The materials obtained as described above are solid pigmentary powders of lower bound water content than the silica from which they have been prepared. They usually are organophilic, often hydrophobic and otherwise have many of the properties of the silica from which they have been prepared.

The finely divided organophilic product thus obtained may be used for many purposes where organophilic silica is useful, such as fillers or reinforcing pigments in polyvinylchloride, polyethylene, isocyanate resins and rubber, including natural rubber and synthetic polymers and copolymers of dienes or in the production of greases by mixing hydrocarbon oils therewith in the amount of 10 to 20 percent by weight of the pigment based on the weight of the oil.

The following are typical rubber recipes which are suitable:

*Recipe "A"*

| | Parts by weight |
|---|---|
| Natural rubber | 100 |
| Zinc oxide | 5 |
| Sulfur | 3 |
| Phenyl-beta-naphthylamine | 1 |
| Benzothiazyl disulfide | 0.8 |
| Diorthotolyl guanidine | 1.8 |
| Silica treated as described herein | 58.5 |

*Recipe "B"*

| | Parts by weight |
|---|---|
| GS–S | 100 |
| Zinc oxide | 5 |
| Sulfur | 3 |
| Phenyl-beta-naphthylamine | 1 |
| Benzothiazyl disulfide | 1.20 |
| Tetramethyl thiuram disulfide | 0.15 |
| Paracoumarone-indene resin | 15.00 |
| Triethanol amine | 4.9 |
| Silica pigment treated as described herein | 58.5 |

The above are typical rubber recipes. The amount of the treated silica pigment thus obtained may range from about 5 to 100 parts by weight per 100 parts of rubber.

Although the present invention has been described with reference to the specific details of certain embodiments, it is not intended that such details shall be regarded as limitations upon the scope of the invention except insofar as included in the accompanying claims.

What is claimed:

1. A method which comprises reacting pulverulent silica pigment which contains bound water but less than 2 percent by weight of free water with an inorganic halide of a metal of groups III to VI, inclusive, periods 2, 3, 4, 5, and 6, said halide being a member of the group consisting of halides having the formula $M(X)_y$, where M is one of said metals, X is halogen, and $y$ is the valence of the metal M, and halides having the formula $MO(X)_z$, where M is a member of the group consisting of sulfur and phosphorus, X is halogen, O is oxygen, and $z$ is the valence of the radical MO, whereby to produce a product which contains acid halide groups and thereafter reacting the resulting product with an organic compound which contains a labile hydrogen and which reacts with acid halide.

2. A method which comprises reacting pulverulent silica pigment which contains bound water but less than 2 percent by weight of free water with an inorganic halide of a metal of groups IV to VI, inclusive, periods 2, 3, 4, 5, and 6, said halide having the formula $M(X)_y$, where M is one of said metals, X is halogen, and $y$ is the valence of the metal, substantially in the absence of liquid water, and thereafter reacting the resulting product with an organic compound which contains a labile hydrogen and which reacts with acid halide.

3. A method which comprises reacting silica pigment which contains bound water but less than 2 percent by weight of free water with an inorganic halide of a metal of groups IV to VI, inclusive, periods 2, 3, 4, 5, and 6, said halide having the formula $M(X)_y$, where M is one of said metals, X is halogen, and $y$ is the valence of the metal, and thereafter reacting the resulting product with an organic compound which contains a labile hydrogen and which reacts with acid halide.

4. A method which comprises reacting pulverulent silica pigment which contains bound water but less than 2 percent by weight of free water with silicon tetrachloride in amount sufficient to react with bound water in said pigment whereby to produce a product containing acid halide groups and thereafter reacting the resulting product with an organic compound which contains a labile hydrogen and which reacts with an acid chloride.

5. A method which comprises reacting pulverulent silica pigment which contains bound water but less than 2 percent by weight of free water with titanium tetrachloride in amount sufficient to react with bound water in said pigment, and thereafter reacting the resulting product with an organic compound which contains a labile hydrogen and which reacts with the acid halide.

6. A method which comprises reacting pulverulent silica pigment which contains bound water but less than 2 percent by weight of free water with tin tetrachloride in amount sufficient to react with bound water in said pigment and thereafter reacting the resulting product with an organic compound which contains a labile hydrogen and which reacts with acid halide.

7. The process of claim 1 wherein the organic compound is a member of the group consisting of amines, alcohols, and organometallic compounds.

8. The process according to claim 1 wherein the organic compound is an alcohol.

9. The process of claim 1 wherein the organic compound is ethanol.

10. A method which comprises contacting pulverulent silica pigment which contains bound water but less than 2 percent by weight of free water with an inorganic chloride of a metal of groups III to VI, inclusive, periods 2, 3, 4, 5, and 6, said chloride being a member of the group consisting of chlorides having the formula $M(Cl)_y$, where M is one of said metals, Cl is chlorine, and $y$ is the valence of the metal M, and chlorides having the formula $MO(Cl)_z$, where M is a member of the group consisting of sulfur and phosphorus, O is oxygen, Cl is chlorine, and $z$ is the valence of the radical MO, whereby to produce a product which contains acid chloride groups, the amount of said inorganic chloride being about 2 to 200 percent by weight of the silica pigment, and thereafter reacting the resulting product with an organic compound which contains a labile hydrogen and which reacts with acid chloride.

11. The process of claim 10 wherein the organic compound is an alcohol.

12. The process of claim 10 wherein the organic compound is an amine.

13. The process of claim 10 wherein the organic compound is a metal alkyl.

14. The process of claim 10 wherein the organic compound is an organometallic compound.

References Cited in the file of this patent

UNITED STATES PATENTS

| 2,578,605 | Sears et al. | Dec. 11, 1951 |
| 2,614,135 | Hirschler | Oct. 14, 1952 |
| 2,626,957 | Orkin | Jan. 27, 1953 |
| 2,705,206 | Wagner | Mar. 29, 1955 |
| 2,739,073 | Bertorelli | Mar. 20, 1956 |
| 2,805,958 | Bueche et al. | Sept. 10, 1957 |
| 2,865,782 | Strassburg | Dec. 23, 1958 |
| 2,865,882 | Strassburg | Dec. 23, 1958 |
| 2,866,716 | Broge | Dec. 30, 1958 |

OTHER REFERENCES

Hackh's Chemical Dictionary, 3rd ed. (1944), pub. by Blakiston, Philadelphia (page 14).

UNITED STATES PATENT OFFICE
CERTIFICATE OF CORRECTION

Patent No. 3,009,827 November 21, 1961

Hans Deuel et al.

It is hereby certified that error appears in the above numbered patent requiring correction and that the said Letters Patent should read as corrected below.

Column 7, line 19, for "GS-S" read --- GR--S ---.

Signed and sealed this 2nd day of October 1962.

(SEAL)
Attest:

ERNEST W. SWIDER
Attesting Officer

DAVID L. LADD
Commissioner of Patents